No. 736,307. PATENTED AUG. 11, 1903.
W. SOBEY.
COMBINED CHECK ROW AND DRILL PLANTER.
APPLICATION FILED APR. 4, 1903.
NO MODEL. 5 SHEETS—SHEET 3.
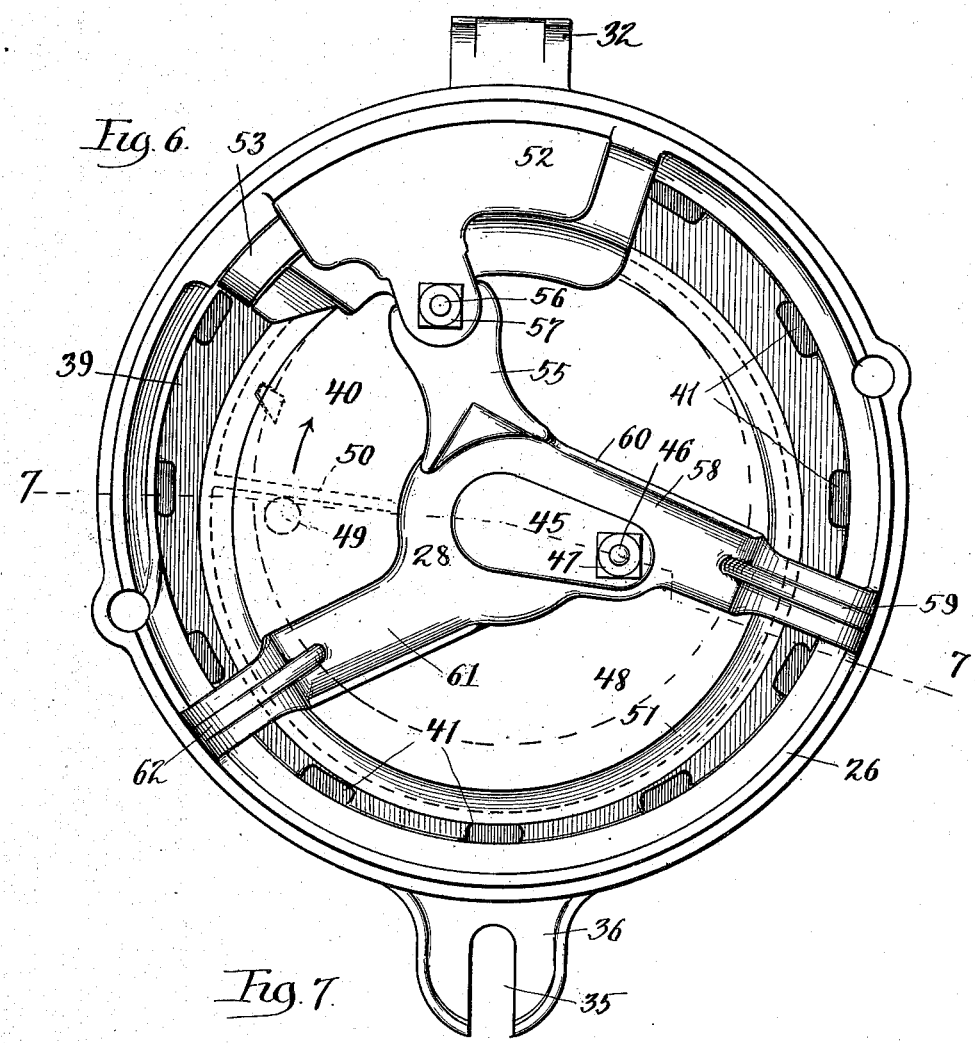
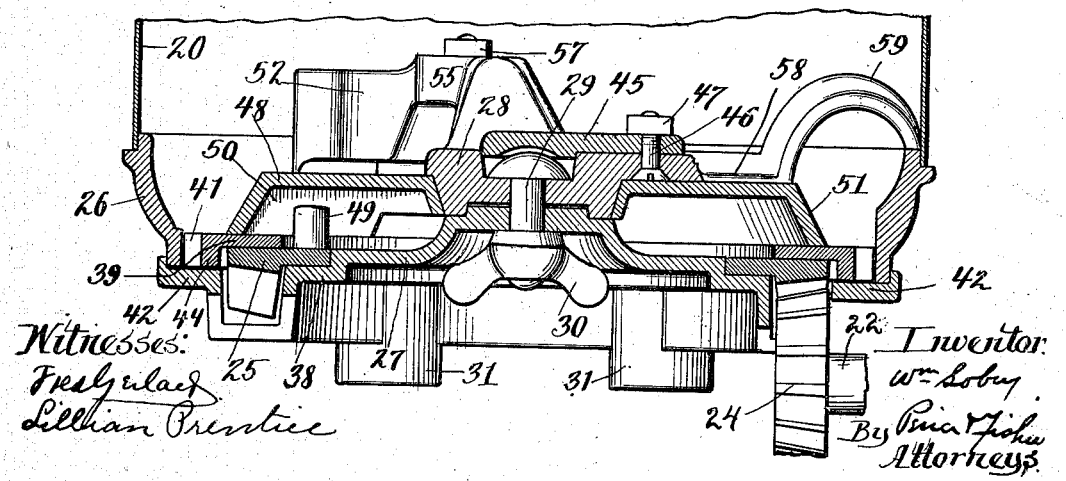

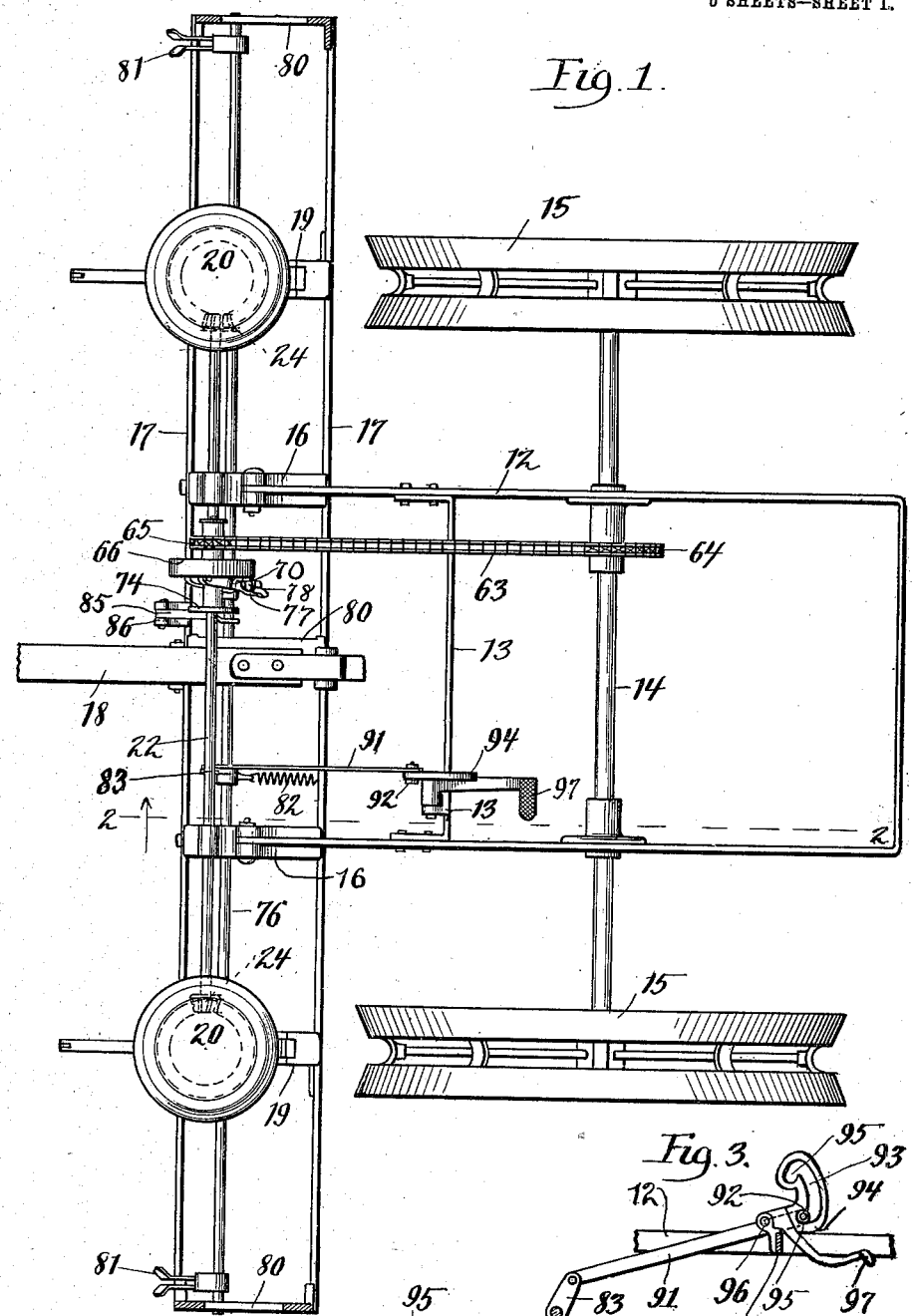

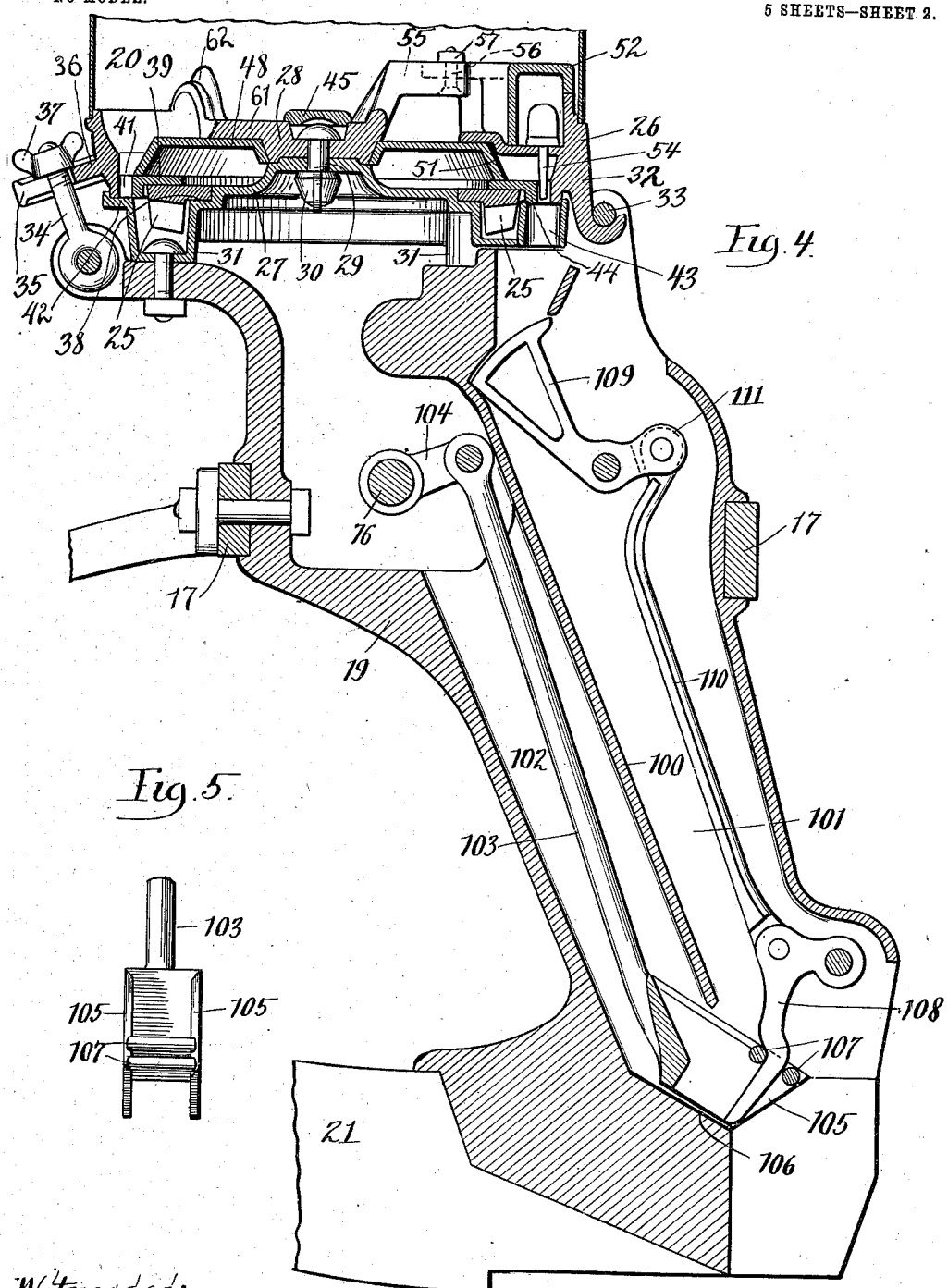

No. 736,307. PATENTED AUG. 11, 1903.
W. SOBEY.
COMBINED CHECK ROW AND DRILL PLANTER.
APPLICATION FILED APR. 4, 1903.
NO MODEL
5 SHEETS—SHEET 4.

Witnesses:

Inventor
Wm Sobey
By Price & Fisher
Attorneys

No. 736,307. PATENTED AUG. 11, 1903.
W. SOBEY.
COMBINED CHECK ROW AND DRILL PLANTER.
APPLICATION FILED APR. 4, 1903.
NO MODEL. 5 SHEETS—SHEET 5.
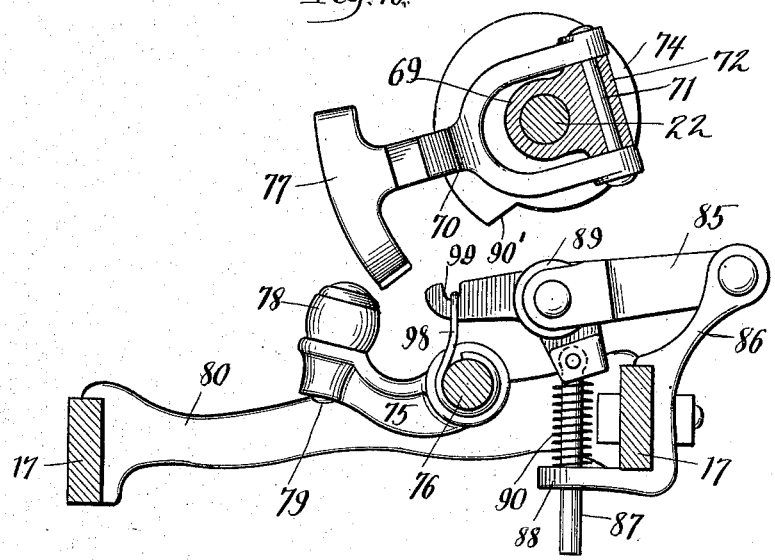
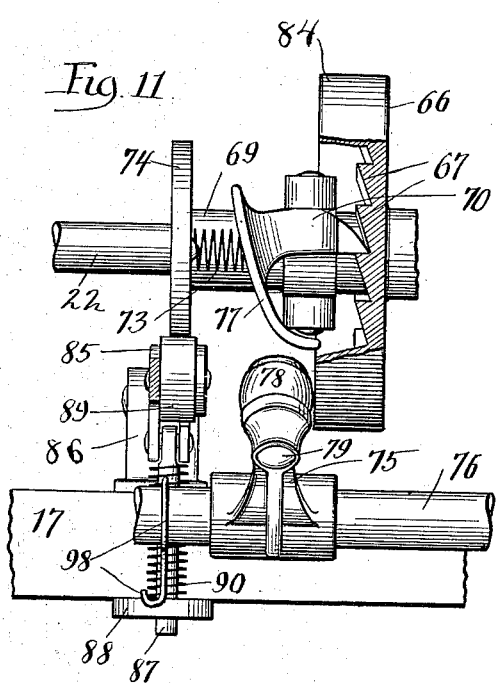
Witnesses: Inventor No. 736,307. Patented August 11, 1903.

UNITED STATES PATENT OFFICE.

WILLIAM SOBEY, OF RACINE, WISCONSIN, ASSIGNOR TO J. I. CASE PLOW WORKS, OF RACINE, WISCONSIN, A CORPORATION.

COMBINED CHECK-ROW AND DRILL PLANTER.

SPECIFICATION forming part of Letters Patent No. 736,307, dated August 11, 1903.

Application filed April 4, 1903. Serial No. 151,036. (No model.)

*To all whom it may concern:*

Be it known that I, WILLIAM SOBEY, a citizen of the United States, and a resident of Racine, county of Racine, and State of Wisconsin, have invented certain new and useful Improvements in a Combined Check-Row and Drill Planter, of which the following is declared to be a full, clear, and exact description.

The invention relates to that class in which the seed-plate is driven from the wheel-axle through an intermediate clutch for separating the seed and delivering the same one at a time to the seed-tube and in which for drill planting the clutch is tripped into and out of action and the drop-valve in the seed-tube is actuated by the check-row devices. When it is desired to drill, it is only necessary in such planters to hold the valves in the seed-tube open and to hold the trip for the clutch out of action.

The present improvement seeks to provide improved means to more effectively stir up the corn in the bottom of the seed cans or hoppers to prevent its banking, and thus effect the charging of the cells of the seed-plate with great regularity.

Further objects of the invention are to improve the construction of the clutch, of the seed-dropping valves, and of the trip mechanism controlling the clutch and valves, so that these parts may be quickly and easily adjusted for check-row or drill planting and will operate with accuracy and certainty in either case.

With these objects in view the invention consists in the features of construction, combinations, and arrangement of parts set forth in the following description, illustrated in the accompanying drawings, and more particularly pointed out in the appended claims.

Figure 8:
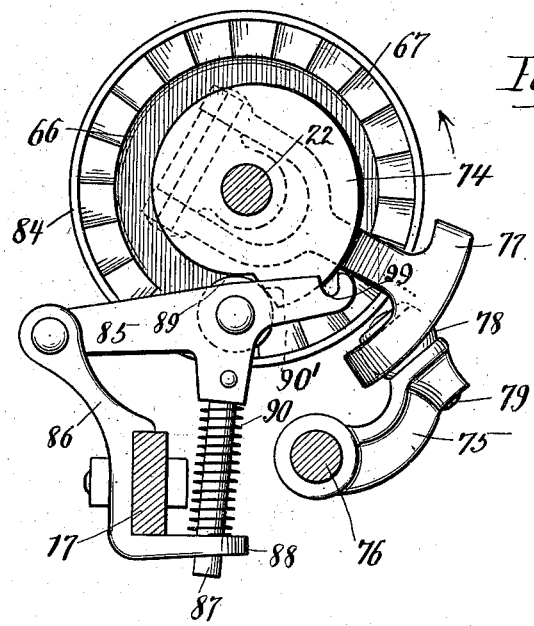
Figure 9:
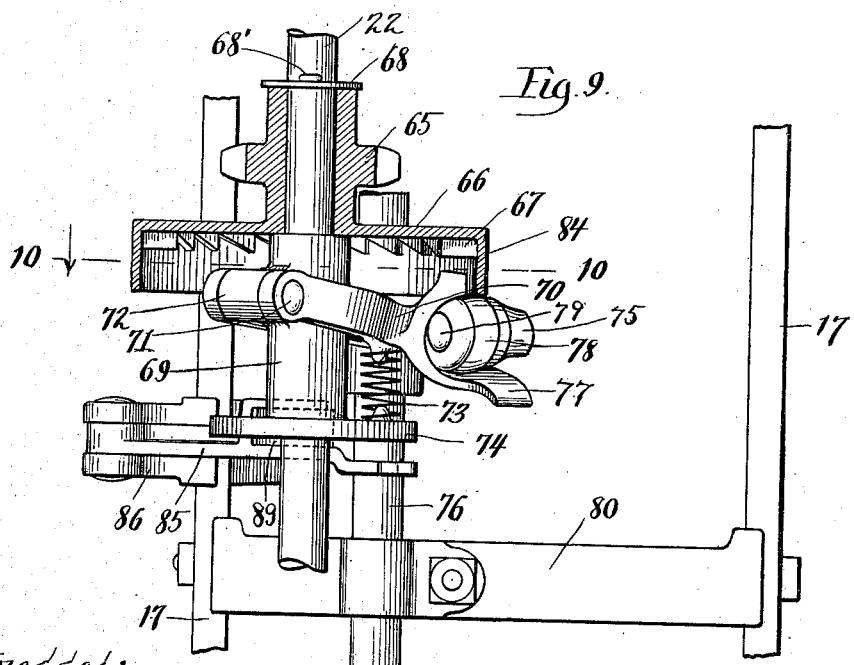

In the drawings, Figure 1 is a plan view of a planter-frame to which the present improvements are applied. Fig. 2 is a detail section on the line 2 2 of Fig. 1. Fig. 3 is a similar view with the parts in a different position. Fig. 4 is a vertical section through the bottom of the seed-can and through the seed-discharge tube. Fig. 5 is a detail side view of the lower end of the plunger for operating the seed-tube valves. Fig. 6 is a plan view of the bottom of the seed-can. Fig. 7 is a vertical section on line 7 7 of Fig. 6. Fig. 8 is a detail face view of the clutch. Fig. 9 is a detail plan view thereof with parts shown in section. Fig. 10 is a section on the line 10 10 of Fig. 9 looking in the direction of the arrow, and Fig. 11 is a rear view of the clutch.

The planter-frame may be of any desired or suitable construction. In that shown to illustrate the present invention the machine or wheel frame of the planter comprises the side bars 12, connected by the cross-bar 13. To the side bars 12 is journaled the wheel-axle 14, to the ends of which the supporting and cover wheels 15 are connected. The forward ends of the side bars 12 are pivotally connected to the castings 16, extending between the transverse bars 17 of the front or runner frame. The rear end of the draft-tongue 18 is connected to the transverse bars 17 of the runner-frame, and between these side bars, at each side of the planter, is secured an irregular-shaped casting 19, as most clearly shown in Fig. 4, which forms a support for the seed can or hopper 20 and also forms the shank of the furrow shoe or runner 21.

A transverse actuating-shaft 22 is journaled in the castings 16. Upon each end of the actuating-shaft 22 is fixed a beveled pinion 24, which meshes with the teeth of a beveled actuating gear-ring 25, sustained upon the bottom of the seed-can 20.

The right and left hand seed-cans, the seed-measuring and delivering mechanism therein, and the seed-valves in the runner-shank are alike in detail. The bottom of the seed-can comprises an angular upstanding flange 26 and a bottom plate 27, removably secured to a washer or hub 28 by a bolt 29 and a winged nut 30. The bottom plate 27 is provided with downwardly-extending leg portions 31, which rest, as shown, upon the upper end of the casting 19. A downwardly-extending hook 32 on flange 26 engages a pintle 33 upon the upper rear portion of the casting 19, so that the seed-can is hinged at this point to the casting or may be entirely removed therefrom. A bolt 34, swiveled to the upper forward portion of the casting 19, extends through a slot 35 in a projection 36 on the bottom flange 26, and a winged nut 37, threaded upon the upper end of the bolt 34, engages the projection 36 and releasably holds the seed-can in position.

The beveled gear-ring 25 for actuating the seed-plate revolves upon a ledge or shoulder 38 upon the bottom plate 27. The annular seed-plate 39 is supported upon the outer periphery of the gear-ring 25 and is detachably connected thereto by lugs 40 on the upper face of the ring-gear, (see dotted lines, Figs. 6,) which engage notches on the inner periphery of the annular seed-plate. The edge of the seed-plate is notched at intervals to form elongated seed cups or cells 41, arranged end to end in circular series and adapted to receive single kernels of corn arranged lengthwise therein and on edge. The outer sides of the cells are closed by the lower portion of the annular bottom flange 26, while the bottoms of the cells are closed by a horizontal ledge 42 upon the outer periphery of the bottom plate 27, except at the discharge-opening 43. (See Fig. 4.) The seed-cells 41 are preferably formed in a depending flange 44 on the edge of the seed-plate 39, so that a deep cell is provided, from which the kernels cannot be easily swept by the overlying grain.

It will be seen that by loosening the winged nut 37 and swinging the bolt 34 out of the slot 35 in the projection 36 the seed-can may be tilted or removed from position, and then by unscrewing the winged nut 30 upon the bolt 29 the gear-ring 25 and seed-plate 39 may be easily removed and changed without removing the contents of the can.

The head of the bolt 29 (see Figs. 4 and 7) is positioned in a recess in the upper face of the washer or hub 28, and a small plate 45 is held over the head of the bolt by a bolt 46 and a nut 47, so that the bolt will not fall out of place when the winged nut 30 is unscrewed.

A feed-plate 48 is rotatably mounted upon the hub 28 above the seed-plate 39 and preferably in the manner set forth in Letters Patent of the United States No. 699,754, issued to L. P. Graham on May 13, 1902. The hub 28 is eccentrically mounted within the can-bottom, so that the circular feed plate or disk is eccentric, as clearly shown in Fig. 6, with reference to the seed-plate 39. Preferably, also, as set forth in the Graham patent, the feed-plate is caused to rotate with the seed-plate and actuating gear-ring by a pin 49 on the gear-ring 25, which engages a radial flange 50 on the under side of the feed-plate 48. (See Fig. 7 and dotted lines, Fig. 6.) The feed-plate 48 is provided with a downwardly-extending inclined or beveled flange 51, which forms the inner wall of a feed-groove above the cells 41 of the seed-plate. The outer wall of the feed-groove is formed by the upwardly-extending bottom flange 26 of the seed-can. In operation, as explained in said prior Letters Patent, the eccentric feed or disk moves to and from the cells in the edge of the seed-plate 39, pushes the grain toward the cells, and uptilts them so that they may fall into the cells edgewise and so that the cells may be uniformly charged with single kernels. At one point of the feed-groove and above the discharge-opening 43 (see Figs. 4 and 6) is positioned a suitable cut-off casing 52, which carries any suitable or desired form of cut-off 53 and ejector 54.

The upper surface of the rotating feed-plate 48 is not covered by a cap-plate, as shown in Letters Patent No. 699,754, above referred to, but is almost entirely exposed. I have discovered that it is particularly desirable that the upper horizontal surface of the feed-plate 48 shall be left exposed adjacent the cut-off casing 52, so that the grain instead of banking up in front of the cut-off will be carried upon the upper exposed surface of the rotating feed-plate past the cut-off casing into the groove beyond the same. The support 55, which extends from the central hub or washer 28, is connected to the cut-off casing 52 by a bolt 56 and a nut 57 and is arched upwardly (see Fig. 4) above the feed-plate 48, so that the upper surface of the feed-plate adjacent the cut-off casing is exposed and so that the grain instead of banking in front of the cut-off is carried upon the upper surface of the rotating feed-plate 48 beneath the arched support 55 as the plate rotates in the direction of the arrow shown in Fig. 6. To assist in agitating the grain and to deflect the grain thus carried around beneath the arched support 55 upon the upper surface of the feed-plate 48, a fixed deflector or baffle 58 is provided beyond the cut-off casing 52 and extends outwardly from the hub or washer 28 over the exposed upper surface of the feed-plate 48 to its edge and is preferably connected to the upper edge of the bottom flange 26 by a terminal arch 59, which extends over the feed-groove. The edge 60 of the baffle or deflector 58, against which the grains strike as they are carried around upon the upper surface of the feed-plate, is preferably slightly inclined toward the feed-groove, and it has been found in practice that the grain is violently agitated and projected by the baffle or deflector 58 backwardly into the feed-groove. Preferably a second corresponding deflector or baffle 61, having a corresponding terminal arch 62, extends from the hub 28 over the exposed upper surface of the feed-plate some distance in advance of the cut-off. It will be observed that the eccentric feed-plate 48 is so located that its nearest approach to the seed-cells is opposite the cut-off and that the deflector 61 is so located that the grain will be precipitated backward into this narrow part of the feed-groove. It has been found in practice that with the present improved arrangement of feed-plate having an exposed upper surface over which the deflectors or baffles 58 and 61 extend the grain in the bottom of the can is carried around upon the upper surface of the feed-plate and as it strikes against the deflectors or baffles is vigorously agitated and precipitated backward into the feed-groove, so that the cells are charged with great uniformity, and all banking of the grain in the bottom of the can is prevented.

The seed-plate-operating shaft 22 is driven from the wheel-axle 14 through the medium of a clutch. (Shown in detail in Figs. 8, 9, 10, and 11.) A drive-chain 63 passes over a sprocket 64, fixed upon the wheel-axle 14, and over a sprocket 65, loosely mounted upon the shaft 22. A disk 66, having on its face near its edge a series of ratchet-teeth 67, is connected to or formed in one piece with the sprocket 65 and forms one of the members of the clutch. The sprocket 65 and the disk 66 are held against longitudinal movement upon the shaft 22 between a washer 68 and a sleeve 69, keyed or otherwise fixed to the shaft. The washer 68 is held in place by a pin or key 68', extending through the shaft. A dog 70, which forms the other member of the clutch, is provided with a yoked inner end extending over the sleeve 69 and connected thereto by a pivot-bolt 71, so that the dog may swing in a plane at right angles to and from the clutch-disk 66. The pivot-bolt 71 extends, as shown, through a projecting ear 72, formed upon the sleeve 69.

The dog 70 is pressed toward the teeth 67 of the disk 66 by a spring 73, which extends between the dog and a disk or cam 74 upon the end of the sleeve 69. The dog 70 is, however, normally held disengaged from the teeth 67 of the disk 66 by a detent 75, mounted upon the usual check-row rock-shaft 76 and arranged to engage an inclined cam 77 upon the end of the clutch-dog 70. To reduce friction, the detent 75 is preferably provided with a roller 78 for engaging the cam 77, such roller being mounted upon a pivot-pin 79, fixed to the end of the detent.

The check-row rock-shaft 76 is journaled on cross-supports 80, extending between the front and rear bars 17 of the runner-frame, and is provided with the usual check-row forks 81, mounted on its ends or connected thereto in any suitable manner. The check-row rock-shaft 76 is held normally in position with the detent 75 in engagement with the cam 77 by a spring 82, extending between the runner-frame and an arm 83, fixed to the rock-shaft.

When the machine is used for planting in check-rows, the rocking movement of the shaft 76, effected by the engagement of a knot on a check-row line with the forks 81, will shift the detent 75 and permit the dog 70 to engage the teeth 67 of the disk 66. The shaft 22 will then be rotated in the direction of the arrow, Fig. 8, through a single revolution until the cam 77 on the clutch-dog again engages the roller 78 upon the detent 75, at which point the dog 70 is again disengaged from the teeth of the clutch-disk. This rotation of the seed-shaft rotates the seed-plate 39 a sufficient distance to move the desired number of cells over the discharge-opening 43. In the machine illustrated the pinion 24 and gear 25 are so proportioned that each revolution of the shaft 22 moves the seed-plate 39 a quarter of a revolution and passes three cells over the discharge-opening. The gearing may be varied as desired and the number of cells in the plate may be so changed that two or more of the cells may move over the discharge at a single operation of the shaft 22.

The disk 66 is preferably provided with a laterally-extending peripheral flange 84, which prevents the teeth 67 of the disk from being clogged by dirt.

It will be observed that when the clutch-dog is held in disengaged position by the detent 75 the spring 73 presses the inclined cam 77 against the roller 78, so that there is a tendency to rotate the seed-plate-actuating shaft 22 in backward direction and permit the reëngagement of the dog 70 with the teeth 67 of the clutch-disk. To overcome this tendency, a second cam 74 and detent 85 are provided. The cam 74, as shown, is formed upon the end of the sleeve 69, and the detent 85 is pivoted upon a bracket 86, secured to the front bar 17 of the runner-frame. The detent 85 is pivoted to a guide-rod 87, which extends downwardly through an inwardly-extending lug 88 upon the bracket 86. A roller 89, mounted on the detent, is spring-pressed against the edge of the cam 74 by a spring 90, coiled about the rod 87 and extending between the detent and the lug 88. The roller 89 normally engages an inclined shoulder 90' upon the cam 74 and overcomes the tendency of the shaft 22 to rotate in backward direction. Moreover, the cams 77 and 74 are rotatively so positioned that just after the cam 77 engages the roller 78 upon the detent 75 the roller 89 upon the spring-pressed detent 85 will engage the inclined shoulder 91' upon the cam 74, and as the roller 89 is forced by the spring 90 down the inclined shoulder 90' the cam 77 will be forced up on the roller 78 of the detent 75 and the clutch-dog 70 will be quickly retracted from the teeth 67 of the clutch-disk. The supplemental cam 74 and detent 75 thus not only prevent any accidental engagement with the clutch dog and disk, but also assist in quickly and accurately disengaging these parts.

The upper end of link 91 (see Fig. 2) is pivoted at one end to the upper end of crank-arm 83 upon the check-row rock-shaft 76. The opposite end of the link 91 is provided with a pin 92, which engages a slot 93 in an arm 94, pivoted upon the cross-bar 13 of the machine-frame. The slot 93 is provided at opposite ends with seats 95 for the pin 92. When the planter is to be used for planting in drills, the pin 92 on the link 91 is placed within the seat 95 at the inner end of the arm 94, and the arm 94 is swung backward into the position shown in Fig. 3, and the rock-shaft 76 is shifted against the tension of its spring 82, and the detent 75 is held disengaged from the cam 77 of the clutch-dog 70, so that the actuating-shaft 22 and seed mechanism in the cans 20 will be continuously operated. In the position of the parts shown in Fig. 3 it will be observed that the pull of the link 91 is below the pivot 96 of the arm 94, so that the parts are locked in this position. When, however, the machine is to be used for planting in check-rows, the pin 92 is placed within the seat 95 at the outer end of the arm 94, as in Fig. 2, in which position the link 91 will not swing below the pivot 96 and cannot be locked in place. To assist in shifting the arm 94, it is preferably provided with a treadle 97.

A hook 98, loosely mounted upon the rock-shaft 76, is adapted to engage a notch 99 in the end of the detent 85, as shown in Fig. 10, to hold the roller 89 out of engagement with the cam 74 when the machine is used for drill planting. It is not necessary that the detent 85 shall be so held out of engagement with the cam 74; but by doing so the annoying clicking of the roller 89 upon the continuously-rotating cam 74 is prevented when the machine is used for planting in drills.

The hollow runner-shank 19 is divided by a partition 100 into the rear seed-tube 101 and the forward chamber 102, within which extends a plunger 103. The upper end of the plunger is pivoted to a crank-arm 104, fixed to the check-row rock-shaft 76. The lower end of the plunger 103 is provided with side extensions 105, which rest upon a rearwardly and downwardly inclined shelf 106. A pair of pins 107 extend between ends of the side extensions 105 of the plunger, and a drop-valve 108, pivoted at its upper end to the runner-shank, extends downwardly and forwardly through the opening or slot between the pins 107, and its lower end normally extends closely adjacent the lower end of the rearwardly-inclined shelf 106. The kernels of corn from the seed-tube 101 pass between the side extensions 105 of the plunger 103 and are retained upon the shelf 106 by the valve 108. When the check-row rock-shaft 76 is operated to move the crank-arm 104 downwardly, the plunger moves downwardly, opening the valve 108 and pushing the hill of corn rearwardly from the shelf 106. On the return movement of the plunger 103 the valve 108 is returned to normal position to close the lower end of the seed-tube.

A check-valve 109, pivoted at the upper end of the seed-tube 101, is normally swung forward to close that portion of the upper end of the seed-tube which is located immediately below the discharge-opening 43 in the bottom of the seed-can, so that the separate kernels which form the hill are accumulated upon the check-valve as the planter travels between rows. A link 110 is pivoted at its lower end to the drop-valve 108 between its ends, and the link at its upper end is pivoted to a rearwardly-extending lug 111 upon the check-valve 109. When the drop-valve 108 is swung downwardly by the plunger 103, as described, the check-valve 109 is swung rearwardly through the medium of the connecting-link 110 to allow the hill of corn accumulated thereon to pass into the tube. The return movement of the check-row rock-shaft 76 and plunger 103, effected by the spring 82, immediately closes the drop-valve 108, so that the hill of corn passes from the check-valve 109 down through the tube and is retained upon the shelf 106 until the next operation of the check-row rock-shaft. It will be understood, of course, that as the valve 108 is closed by the upward shift of the plunger 103 the check-valve 109 is also returned to its normal closed position.

When the machine is used for planting in drills, the check-row rock-shaft 76 is shifted and held in shifted position by the arm 94, link 91, and crank 92, as above described. In this position, as already stated, the detent 75 is held out of engagement with the clutch-dog, so that the latter engages the clutch-disk 66, and the plunger 103 is held in its lowermost shifted position, so that both the drop-valve 108 at the lower end of the seed-tube 101 and the check-valve 109 at its upper end are held in open position, and the kernels, discharged one at a time by the seed-plate 39 through the discharge-opening 43, fall directly through the seed-tube into the furrow. By this arrangement it will be seen that the machine may be easily and quickly adapted for planting either in check-rows or in drills.

It is obvious that numerous changes may be made in the details of structure without departure from the essentials of the invention.

Having described my invention, what I claim as new, and desire to secure by Letters Patent, is—

1. In planters, the combination with a seed-can, of a seed-plate in the can-bottom, a feed-plate above said seed-plate and rotating therewith, said feed-plate having an exposed upper surface and a downwardly-extending edge forming the inner wall of a feed-groove above the cells of the seed-plate and a baffle extending over the exposed upper surface of said feed-plate.

2. In planters, the combination with a seed-can, of a rotating seed-plate in the can-bottom, a feed-plate above said seed-plate and rotating therewith, said feed-plate having an exposed upper surface and a downwardly-extending edge forming the inner wall of a feed-groove above the cells of the seed-plate and baffles extending outwardly from the center of said feed-plate over the exposed upper surface thereof to its edge.

3. In planters, the combination with a seed-can, of a rotating seed-plate in the can-bottom, a feed-plate above said seed-plate and rotating therewith, said feed-plate having an exposed upper surface and a downwardly-extending edge forming the inner wall of the feed-groove above the shelves of said seed-plate, an upwardly-extending portion of the can-bottom forming the outer wall of said feed-groove and narrow deflecting-baffles extending outwardly from the center of said feed-plate over the exposed upper surface thereof to its edge, said baffles having terminal arches extending above said feed-groove to the outer wall thereof.

4. In planters, the combination with a seed-can, a rotating seed-plate in the can-bottom, a feed-plate above said seed-plate and rotating therewith, said feed-plate having a downwardly-extending edge forming the inner wall of a feed-groove above the cells of the seed-plate, a cut-off and a casing therefor at one portion of the feed-groove, the upper surface of said feed-plate adjacent said cut-off casing being exposed so that the seed deflected by the cut-off will be carried past the cut-off casing upon the exposed upper surface of said rotating feed-plate.

5. In planters, the combination with a seed-can, a rotating seed-plate in the can-bottom, a feed-plate above said seed-plate and rotating therewith, said feed-plate having a downwardly-extending edge forming the inner wall of a feed-groove above the cells of the seed-plate, a cut-off and a casing therefor at one portion of the feed-groove, the upper surface of said feed-plate adjacent said cut-off casing being exposed, and a fixed baffle extending over the upper surface of said feed-plate beyond said cut-off casing.

6. In planters, the combination with a seed-can, of a rotating seed-plate in the can-bottom, a feed-plate above said seed-plate and rotating therewith, said feed-plate having an exposed upper surface and a downwardly-extending edge forming the inner wall of a feed-groove above the cells of said seed-plate, a cut-off and a casing therefor at one portion of the feed-groove, a center hub for said feed-plate, a supporting-arch extending above said feed-plate between said center hub and said cut-off casing and a baffle beyond said cut-off casing extending from said hub outwardly over the exposed upper surface of said feed-plate to its edge.

7. In planters, the combination with a seed-can, of a rotating seed-plate in the can-bottom, an eccentrically-disposed feed-plate above said seed-plate and rotating therewith, said feed-plate having an exposed upper surface and a downwardly-extending edge forming the inner wall of a feed-groove above the cells of the seed-plate and baffles extending outwardly from the center of said eccentric feed-plate over the exposed upper surface thereto to its edge.

8. In planters, the combination with a seed-can, of a rotating seed-plate in the can-bottom, an eccentrically-disposed feed-plate above said seed-plate and rotating therewith, said feed-plate having a downwardly-extending edge forming the inner wall of a feed-groove above the cells of said seed-plate, a cut-off and a casing therefor at one portion of the feed-groove, the upper surface of said feed-plate adjacent said cut-off casing being exposed, so that the seed deflected by the cut-off will be carried by said cut-off casing upon the exposed upper surface of said rotating plate.

9. In planters, the combination with a seed-can, of a seed-plate in the can-bottom, an eccentrically-disposed feed-plate above said seed-plate having a downwardly-inclined edge flange forming the inner wall of a feed-groove above the cells of said seed-plate, an upwardly-extending portion of the can-bottom forming the outer wall of the feed-groove, a cut-off and a casing therefor at one portion of the feed-groove, a center hub for said feed-plate, a supporting-arch extending above said feed-plate between said center hub and said cut-off casing and deflecting-baffles beyond said cut-off casing extending from said hub outwardly over the exposed upper surface of said feed-plate to its edge, said baffles having terminal arches extending above the feed-groove to the outer wall thereof.

10. In planters, the combination with the wheel-axle, the seed-cans and the seed measuring and separating mechanism therein, of a transverse operating-shaft, a clutch-disk loose on said shaft and operatively connected to said wheel-axle, a spring-held clutch-dog pivoted to said shaft to swing at right angles to and from said clutch-disk, teeth formed upon one face of said disk adapted to be engaged by said dog, an inclined cam fixed upon the end of said dog, a check-row rock-shaft and a detent on said rock-shaft normally engaging said dog to hold it in disengaged position.

11. In planters, the combination with a wheel-axle, the seed-cans and the seed measuring and separating mechanism therein, of a transverse operating-shaft, a clutch member loose on said shaft and operatively connected to said wheel-axle, a second clutch member secured to said shaft, a cam and detent for disengaging said clutch members and an independent cam and detent for preventing the backward movement of said shaft when said clutch members are disengaged.

12. In planters, the combination with the wheel-axle, the seed-cans and the seed measuring and separating mechanism therein, of a transverse operating-shaft, a clutch member loose on said shaft and operatively connected to said wheel-axle, a second clutch member secured to said shaft, a trip-rod, cam and detent members for disengaging said clutch members, one of said cam and detent members being mounted on said tight clutch member and the other on said trip-rod, and independent cam and detent members, one mounted on said actuating-shaft and the other on the machine-frame.

13. In planters, the combination with the wheel-axle, the seed-cans and the seed measuring and separating mechanism therein, of a transverse operating-shaft, a clutch member loose on said shaft and operatively connected to said wheel-axle, a second clutch member secured to said shaft, a cam and detent for disengaging said clutch members, a disk cam having an inclined shoulder fixed to said actuating-shaft and a spring-held detent mounted on the machine-frame having a roller normally engaging the inclined shoulder of said disk cam.

14. In planters, the combination with the wheel-axle, the seed-cans and the seed measuring and separating mechanism therein, of a transverse operating-shaft, a clutch-disk having ratchet-teeth loose on said shaft and operatively connected to said wheel-axle, a spring-held dog pivoted to said shaft and arranged to engage the teeth of said clutch-disk, an inclined cam formed on said dog, a check-rod rock-shaft, a detent arranged to engage said inclined cam to disconnect said dog from said clutch-disk, a disk cam having an inclined shoulder on its edge fixed to said actuating-shaft and a spring-held detent mounted on the machine-frame having a roller normally engaging said inclined shoulder.

15. In planters, the combination with the wheel-axle, the seed-cans and the rotating seed-plates in said cans, of a transverse actuating-shaft for said seed-plate, a clutch for connecting said wheel-axle and said actuating-shaft, a spring-held check-row rock-shaft, a tripping-detent for said clutch mounted on said rock-shaft, an arm pivoted to the main frame, a crank fixed to said rock-shaft, a link pivoted at one end to said crank and means for connecting the opposite end of said link to the outer or inner end of said pivoted arm for holding said tripping-detent into and out of operative relation with said clutch.

16. In planters, the combination with the wheel-axle, the seed-cans and the rotating seed-plates in said cans, of a transverse actuating-shaft for said seed-plate, a clutch for connecting said wheel-axle and said actuating-shaft, a spring-held check-row rock-shaft, a tripping-detent for said clutch mounted on said rock-shaft, an arm pivoted to the main frame, a crank fixed to said rock-shaft, a link pivoted at one end of said crank, a pin upon the opposite end of said link, a slot in said pivoted arm engaged by said pin and seats at the inner and outer end of said slot for said pin.

17. In planters, the combination with the seed-can, the seed separating and measuring devices therein and the seed-discharge tube, of a shelf at the lower end of said tube, a pivoted valve normally engaging said shelf to close the lower end of said tube and a plunger for pushing the seed rearwardly from said shelf, said plunger being positively connected to said valve to shift the same in opposite directions.

18. In planters, the combination with the seed-can, the seed separating and measuring devices therein, and the seed-discharge tube, of a rearwardly and downwardly inclined shelf at the lower end of said tube, a plunger resting on said shelf having side extensions, guides carried by said side extensions, a pivoted drop-valve extending between said guides with its lower end normally adjacent the lower edge of said inclined shelf, a check-row rock-shaft and an arm on said rock-shaft pivoted to the upper end of said plunger.

19. In planters, the combination with a seed-can, the seed separating and measuring devices therein and a seed-discharge tube, of a shelf at the lower end of said tube, a pivoted discharge-valve normally engaging said shelf to retain the seed thereon, a pivoted check-valve at the upper end of said discharge-tube, a link connecting said pivoted valves, a plunger engaging said discharge-valve to open and close both of said valves and to project the seed rearwardly from said shelf.

20. In planters, the combination with the seed-can, the seed separating and measuring devices therein and the seed-discharge tube, of a rearwardly-inclined shelf at the lower end of said tube, a plunger resting on said inclined shelf and having side extensions, pins extending between said side extensions, a pivoted drop-valve extending between said pins with its lower end normally adjacent the lower edge of said inclined shelf, a pivoted check-valve at the upper end of said tube, a link connecting said check-valve and said drop-valve, a check-row rock-shaft, and an arm on said rock-shaft pivoted to the upper end of said plunger.

21. In planters, the combination with the wheel-axle, the seed-cans and the seed separating and measuring devices therein, of a transverse operating-shaft for said seed mechanism, a clutch for connecting said wheel-axle and said actuating-shaft, a check-row rock-shaft, a detent for tripping said clutch mounted on said rock-shaft, a seed-discharge tube, a check-valve at the upper end of said tube, a drop-valve at its lower end, a plunger operatively connected to said rock-shaft for shifting said valves and means for holding said rock-shaft in shifted position to hold said detent disengaged from said clutch and to hold said valves in open position.

22. In planters, the combination with the wheel-axle, the seed-cans and the seed separating and measuring devices therein, of a transverse operating-shaft for said seed mechanism, a clutch for connecting said wheel-axle and said actuating-shaft, a check-row rock-shaft, a detent for tripping said clutch mounted on said rock-shaft, a seed-discharge tube, a pivoted check-valve at the upper end of the tube, a pivoted drop-valve at the lower end thereof, a link connecting said valves, a plunger connected to said drop-valve, an arm on said rock-shaft pivoted to the upper end of said plunger and means for holding said rock-shaft in position with said detent out of engagement with said clutch and with said valves open.

WILLIAM SOBEY.

Witnesses:
  GEORGE HENRY BOLTON,
  HAROLD PERRY ERSKINE.